United States Patent
Mason et al.

(10) Patent No.: US 10,405,412 B2
(45) Date of Patent: Sep. 3, 2019

(54) USE OF A LIGHTING SYSTEM TO INDICATE APPLICATION STATUS

(71) Applicant: SIGNIFY HOLDING B.V., Eindhoven (NL)

(72) Inventors: Jonathan David Mason, Waalre (NL); Dzmitry Viktorovich Aliakseyeu, Eindhoven (NL); Marjolein Dimmie Van Der Zwaag, Eindhoven (NL); Remco Magielse, Tilburg (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 16/300,277

(22) PCT Filed: May 3, 2017

(86) PCT No.: PCT/EP2017/060449
§ 371 (c)(1),
(2) Date: Nov. 9, 2018

(87) PCT Pub. No.: WO2017/194358
PCT Pub. Date: Nov. 16, 2017

(65) Prior Publication Data
US 2019/0141823 A1  May 9, 2019

(30) Foreign Application Priority Data
May 10, 2016 (EP) .................................... 16168853

(51) Int. Cl.
*H05B 37/02* (2006.01)
*H04M 1/725* (2006.01)

(52) U.S. Cl.
CPC ...... *H05B 37/0272* (2013.01); *H04M 1/7253* (2013.01); *H05B 37/0227* (2013.01)

(58) Field of Classification Search
CPC ................ H05B 37/02; H05B 37/0227; H05B 37/0272; H05B 33/08; H04M 1/7253
See application file for complete search history.

(56) References Cited

U.S. PATENT DOCUMENTS 8,264,168 B2 * 9/2012 Feri ...................... H05B 37/029
315/294
2008/0143517 A1  6/2008 Goffin
(Continued)

FOREIGN PATENT DOCUMENTS

CA  2355222 A1  1/2003
DE  4327718 A1  2/1995
(Continued)

OTHER PUBLICATIONS

Belkin International, Inc., "Make it Wemo, Your Homt at Your Fingertips, Wemo is a Family of Simple and Customizable Products That Allow You to Control Home Electronics From Anywhere," USB-C Resource Center: Everything You Need to Know, 2016 (6 Pages).
(Continued)

*Primary Examiner* — Jimmy T Vu
(74) *Attorney, Agent, or Firm* — Akarsh P. Belagodu (57) ABSTRACT

A method comprising: receiving a first user input signal indicating that the user has performed a first interaction with a user input element of a lighting system; based thereon, controlling the illumination emitted by at least one luminaire of the lighting system; detecting a notification generated by an application, wherein the application provides the user with a second service other than controlling a lighting system, and the notification is indicative of an event occurring within the second service; in response to detecting this notification, automatically controlling the lighting system in order to alert the user to the event; receiving a second user input signal indicating that the user has performed a second interaction with the user input element of the lighting system following the alerting of the user; and in response to the receipt of the second user input signal, automatically performing an action in relation to the second service.

13 Claims, 3 Drawing Sheets

(56) References Cited

U.S. PATENT DOCUMENTS

2009/0085500 A1     4/2009   Zampini, II et al.
2013/0026947 A1     1/2013   Economy et al.
2015/0339912 A1    11/2015   Farrand et al.

FOREIGN PATENT DOCUMENTS

WO     2014198533 A2    12/2014
WO     2015150927 A1    10/2015
WO     2016001780 A1     1/2016

OTHER PUBLICATIONS

Iphone & Android Lighting Control Apps—Home Controls, Smart Phone Lighting Control Apps, http://web.archive.org/web/20151007033141/http://www.homecontrols.com:80/categories/iphone-lighting-control-apps, Mar. 10, 2017 (7 Pages).

Lumifi, "Lighting Design Expert at Your Fingertips," https://itunes.apple.com/us/app/lumifi/id897500861?mt=8, 2014 (5 Pages).

\* cited by examiner

USE OF A LIGHTING SYSTEM TO INDICATE APPLICATION STATUS

CROSS-REFERENCE TO PRIOR APPLICATIONS

This application is the U.S. National Phase application under 35 U.S.C. § 371 of International Application No. PCT/EP2017/060449, filed on May 3, 2017, which claims the benefit of European Patent Application No. 16168853.6, filed on May 10, 2016. These applications are hereby incorporated by reference herein.

TECHNICAL FIELD

The present disclosure relates to the use of a lighting system to indicate the status of an application, e.g. an "app" running on a mobile device such as a smart phone or tablet, or a web-hosted application such as a social media application.

BACKGROUND

For many people the pressure to monitor apps is becoming a central part of their life, e.g. to keep track of social media, stocks, e-mail, instant messaging (IM), etc. The need to keep an eye on smart devices is increasing for many, but constantly watching a screen can be an impediment against working on other things in real life, such as managing a family, work, or social life.

One existing technology suitable to help people with this, is the ability to automatically adjust the light emitted by a luminaire when a status of an app changes. Such illumination can be made omnipresent or at least pervasive within an environment occupied by a user, and thus can be used to provide information to the user in an "ambient" form, i.e. the user can be made aware of the information through his or her general experience of the environment which he or she currently occupies, rather than having to specifically divert his or her attention to a screen or a user terminal such as a smartphone, tablet, laptop or desktop computer.

Enabling an application to control one or more luminaires can be achieved through so-called "connected lighting". Connected lighting refers to a system of one or more luminaires which are controlled not by (or not only by) a traditional wired, electrical on-off or dimmer circuit, but rather by using a data communications protocol via a wired or more often wireless connection, e.g. a wired or wireless network. Typically, the luminaires, or even individual lamps within a luminaire, may each be equipped with a wireless receiver or transceiver for receiving lighting control commands from a lighting control device according to a wireless networking protocol such as ZigBee, Wi-Fi or Bluetooth (and optionally also for sending status reports to the lighting control device using the wireless networking protocol). The lighting control device may take the form of a user terminal, e.g. a portable user terminal such as a smartphone, tablet, laptop or smart watch; or a static user terminal such as a desktop computer or wireless wall-panel. In such cases the lighting control commands may originate from an application running on the user terminal, either based on user inputs provided to the application by the user through a user interface of the user terminal (e.g. a touch screen or point-and-click interface), and/or based on an automatized function of the application. The user equipment may send the lighting control commands to the luminaires directly, or via an intermediate device such as a wireless router, access point or lighting bridge.

A summary of apps for controlling connected lighting has been disclosed for example at http://homecontrols.com in an article titled "Smart Phone Lighting Control Apps", dated 2 Jan. 2016 (http://www.homecontrols.com/Categories/iPhoneLightingControlApps).

SUMMARY

As mentioned, it is known to use connected lighting to alert a user to a change in the status of an app. However, this only exploits the lighting system to notify the user of incoming events. It is recognized herein that this is only one half of the problem, as most digital services are interactive (two-way). In this case the user still has to respond in some way, e.g. to reply to an email or IM or to send an acknowledgment to a friend's social media update. Without further modification, this means that despite being alerted via the lighting, then in order to respond or react, the user still has to revert to a user terminal with a screen and navigate through the on-screen user interface of the second service.

To address this or other similar considerations, it is recognized herein that with the ever increasing integration of "smart" components such as smart light switches in lighting systems or motion sensors (e.g. accelerometers) in portable or movable luminaires, then the lighting system can also be exploited as a means of the user responding to incoming events.

According to one aspect disclosed herein, there is provided a method of interfacing with a lighting system comprising one or more luminaires which provide a first service of emitting illumination into an environment occupied by a user, the method comprising: (a) receiving a first user input signal indicating that the user has performed a first interaction with a user input element of the lighting system; (b) controlling the illumination emitted by at least one of the luminaires based on the first user input signal; (c) detecting a notification generated by an application, wherein the application provides the user with a second service other than controlling a lighting system (e.g. email, IM, social media or controlling a household appliance), and the notification is indicative of an event occurring within the second service; (d) in response to the detection of said notification, automatically controlling the lighting system in order to alert the user to said event; (e) receiving a second user input signal indicating that the user has performed a second interaction with the user input element of the lighting system following said alerting of the user to said event (e.g. by pressing a smart switch, using a lighting control app or moving a movable luminaire); and (f) in response to the receipt of the second user input signal, automatically performing an action in relation to the second service.

Thus the user is provided with means of both being alerted and responding to events in the digital world without having to divert his or her attention to a screen, or at least without having to navigate the usual user interface of the second service (e.g. IM client, social media site, etc.). Furthermore, as the means by which the user responds or reacts to the event is made part of the same lighting system as the means of being alerted to the event, this provides an intuitive and readily-to-hand means of response or reaction.

Note that the "action" performed automatically in response to the second user interaction may take any of a variety of forms, as will be borne out by the varied use cases discussed below. For example, the action may be to send a predefined (predetermined) response signal in relation to the second service, e.g. to communicate the predefined response signal to the second service and/or the application.

In embodiments said automatic control of the lighting system to alert the user to said event may comprise: controlling the illumination emitted by at least one or the luminaries, such as by controlling the intensity, colour (e.g. colour temperature), beam direction, beam profile or a dynamic effect of the emitted illumination. This advantageously provides a form of "ambient information" for alerting the user, as discussed previously. However, it is also possible that at least one of the luminaires may be equipped with a transducer for generating an additional effect other than a lighting effect, the additional effect comprising an odour, a vibration, a movement of the luminaire, or a haptic effect. In such cases said automatic control of the lighting system to alert the user to the event may comprise: controlling this additional effect (as an alternative or in addition to controlling the illumination).

In embodiments, said user input element is a light switch, i.e. a so-called "smart light switch". E.g. the first and/or second user interaction may comprise the user pressing an on-off button of the switch, turning a rotary element, or sliding a slider of the switch. Alternatively said user input element may be a user interface of lighting control software run on a user terminal, i.e. a so-called lighting control "app". N.B. the user terminal running the lighting control software may or may not be the same device as runs the code for performing the above-recited method. As another alternative embodiment, the user input element may be a moveable luminaire (e.g. a portable luminaire), being one of said one or more luminaires of the lighting system. In this case each of the first and second user interactions may comprise the user moving the moveable luminaire.

All of these means of interaction advantageously provide particularly intuitive ways for the user to respond or react to an event which he or she alerted to through the lighting system.

In embodiments, the method may comprise detecting, from the second user input signal, which of multiple options for interacting with the lighting system the user has used; and the action performed automatically in response to the second user input signal is a function of which of the multiple options the user has used. Thus advantageously, despite the fact that the user is responding or reacting through a lighting system rather than a conventional user interface of the second service, the user does not have to always provide only a single predefined response, but rather may be provided with different available responses or reactions to choose from.

In embodiments, the automatic performance of said action may be made conditional on said second interaction or the receipt of said second user input signal occurring within a predetermined window of time following the event or the detection of the notification of the event. I.e. if the user does not respond in time, the user input element of the lighting system goes back to having its normal function of just controlling the lighting.

In embodiments, the second user interaction may be the same as the first interaction, but the method may comprise refraining from controlling the illumination from any of the luminaires based on the second user input signal, on condition that the second user interaction or the receipt of the second user input signal occurs within said window of time. Thus when the user performs the interaction following the event, then, depending on the particular embodiment, this interaction may or may not have the function which it would do otherwise of actually controlling one or more of the luminaire. E.g. the first user interaction may comprise the user selecting to adjust a brightness, colour, direction, beam profile or dynamic effect of the illumination (e.g. via the smart light switch of the user interface of the lighting control software in his or her user terminal), in which case the lighting system controls the lighting accordingly. However, when this same interaction is performed by the user on another occasion following the event or at least the detection of the event (i.e. the second user interaction), then in embodiments this does not have the normal function of adjusting a brightness, colour, direction, beam profile or dynamic effect of the illumination (whereas when the user performs this same interaction at other times, then it does have this function). Thus the function of the lighting system is adapted appropriately to the circumstances. Note however that is not excluded that the second interaction could have both the function of reacting to the event and its normal function of controlling the lighting system (e.g. adjusting a brightness, colour, direction, beam profile or dynamic effect of the illumination, the same as it would in response to the first user interaction).

Some particularly advantageous example use cases are set out below.

In embodiments, the second service is a communication service for communicating between a user terminal of the user and a remote entity over a network, and said event may comprise an incoming communication from the remote entity addressed to the user via the communication service. In this case the action performed automatically in response to the receipt of the second user input signal may comprise: responding to the incoming communication by sending a predetermined response to the remote entity via the communication service.

Thus the user is advantageously provided with a means not only of being altered to, but also interacting with, the online world (e.g. responding to incoming messages or social media feeds) without having to divert his or her attention to a screen, or without having to go to or pick up a user terminal such as a smartphone, tablet etc., or at least without having to navigate the conventional user interface of the communication service.

For instance, the remote entity may be a remote terminal, the communication service may comprise an inter-user communication service, and the incoming communication may comprise an incoming communication sent from a person using the remote terminal. In this case the predetermined response may comprise: a predetermined message to the person who sent the incoming communication. For example the incoming communication may comprise an email, IM message, voicemail, picture message, video message, or incoming voice or video call establishment request. The predetermined message may be sent by any such medium as well, either the same medium as the incoming message or a different medium. For example if the incoming message is an IM, the predetermined response may be an IM saying something to the effect of "I'm busy now, will reply later". Or if the incoming communication is an incoming call establishment request, i.e. someone is ringing the user, then the predetermined response may be to send back a call acceptance response to answer the call (e.g. by speaker phone or wireless headset).

In some particular instances of this, the event may comprise an incoming communication from a particular person or particular group of people, and said automatic control of the lighting system may be performed on condition that the incoming communication is from said particular person or group of people.

As another example, the remote entity is a server, the communication service comprises a social media service hosted by the server, and the incoming communication comprises a notification of an update occurring within the social media service. In this case the predetermined response may comprise: a predetermined response being uploaded to the social media service, e.g. posting precomposed message, or sending a predetermined status to the social media service (e.g. which may indicate the user's availability and/or current activity).

As another example, the remote entity may be a server, the communication service may comprise an online video game conducted via the server, and the incoming communication may comprise a notification of game event occurring within the video game. In this case the predetermined response may comprise: a command to perform a predetermined action within the game.

As another example, the remote entity may be a server, the communication service may comprise an online purchasing system, and the incoming communication may comprise a notification of an update occurring within the online purchasing service. In this case the predetermined response may comprise: submitting a request to make a purchase via the online purchasing system.

E.g. the communication service may comprise an online auction conducted via the server, in which case the event may comprise a notification of bid in the auction, and the request which is submitted in response to the receipt of the second user input signal may comprise: placing a rival bid in the auction. Or the communication service may comprise an online shopping service hosted by the server, in which case the event may comprise a notification of a new product available to buy via the online shopping service or a new deal on offer via the online shopping service, and the request which is submitted in response to receipt of the second user input signal may comprise: a request to buy the new product or accept the new deal.

In another example use case, the second service may comprise a monitoring of a bodily state of the user via one or more sensors, said application may be configured to read one or more sensor readings indicative of the user's bodily state from the one or more sensors, and said event may comprise a change in the user's bodily state. In this case the action which performed automatically in response to the second user input signal may comprise: logging a reaction of the user to the event as indicated by said second user interaction. Thus advantageously, the user is provided with an intuitive means of interacting with a system for monitoring his or her bodily state, e.g. physical signs of stress. E.g. a monitoring application may monitor the user's stress level or a number of steps taken by the user over the course of a certain time window such as a day, and may indicate this through a property of a luminaire (e.g. colour of the emitted illumination). The user can then interact with the luminaire to respond to the monitoring application about how he or she feels, e.g. by changing the colour of the emitted illumination or performing some other action such as moving the luminaire if it is moveable (e.g. portable).

In yet another example use case, the second service may comprise a function provided by a home appliance, said application being an application which is able to monitor and/or control the home appliance, and said event comprising an event relating to the function provided by the home appliance. In this case the action which is automatically performed in response to the receipt of the second user input signal may comprise: controlling the function of the home appliance or controlling a function of another home appliance.

As a particular example of this, the home appliance may comprise a heating system (e.g. central heating) and the function provided by this home appliance may be heating, said event comprising a change in the heating. In this case the action which is automatically performed in response to the detection of said second user interaction may comprise: controlling the heating provided by the heating system.

As another example, the home appliance may comprise a cooker and the function provided by this home appliance may be cooking, said event comprising an event relating to the cooking (e.g. the cooking time is over). In this case the action which is automatically performed in response to the detection of said second user interaction may comprise: controlling the cooking performed by the cooker (e.g. turn it off).

As another example, the home appliance may comprise a media player and the function provided by this home appliance may be playing out media (music and/or video), said event comprising an event relating to the media playout (e.g. the end of a track, playlist, TV show or movie). In this case the action which is automatically performed in response to the detection of said second user interaction may comprise: controlling the media playout (e.g. start a new track, playlist, TV show or movie).

In an example where the home appliance generating the event is different from the controlled home appliance, the second service may comprise a monitoring of a baby via a baby monitor unit, said application may be configured to detect whether or not the baby is crying based on sound and/or images received from the monitoring unit, and said event may comprise detecting that the baby is crying. In this case the action which is automatically performed in response to the detection of said second user interaction may comprise: controlling a music player to play music to the baby.

In addition to the variety of possible used cases, note that there are a number of possibilities for the way in which the second service is implemented. The second service may be provided directly by the application running locally on a user terminal used by the user to obtain the second service, in which case said event comprises a change in status of the local application. Alternatively the second service may be provided by a remotely-hosted application hosted at on a server (separate from the user terminal), in which case said event comprises a change in status of the remotely-hosted application. In the latter case the application on the user terminal is arranged to access the remotely-hosted application on the server via a network, e.g. the Internet. For instance the local application on the user equipment may be a web-browser, the server may be web server, and the second service may be provided through a website. As another possibility, the second service may be provided by a combination of the local application on the user equipment and the remotely-hosted application (e.g. web-hosted) application. In this case the event may comprise a change in status of either or both of the local and remotely-hosted application. For instance the local application may comprise a dedicated social media client or a dedicated messaging client such as an email client or IM client.

According to another aspect disclosed herein, there may be provided a computer program product comprising code embodied on computer-readable storage and configured so as when run on one or more processing units to conduct a method in accordance with any of the embodiments disclosed herein.

According to another aspect disclosed herein, there may be provided user equipment (e.g. a smartphone or tablet) which comprises: a control interface for interfacing with a lighting system comprising one or more luminaires which provide a first service of emitting illumination into an environment, the control interface enabling the user terminal to control the illumination via said control interface when the environment is occupied by a user of the user terminal; memory storing software comprising an application for providing or accessing a second service other than controlling a lighting system; and processing apparatus comprising one or more processors arranged to run said software so as to provide or access said second service from the user terminal. The software may comprise control code configured so as, when run on the processing apparatus, to perform operations of: (A) detecting an event occurring within the second service, and in response automatically controlling the lighting system via said control interface in order to alert the user to said event; (B) detecting that the user has interacted with the lighting system following said alerting of the user to said event (e.g. by pressing smart light switch or moving a portable luminaire); and (C) in response to the detection of said interaction, automatically performing an action in relation to the second service (e.g. responding to an incoming email or IM message, responding to social network update, or logging a reaction of the user to a monitored event).

In embodiments, the control code may be further configured, so as when run on the processing apparatus, to conduct operations in accordance with any of the method features recited herein.

Note also that the control code may be part of the same application running on the user equipment which provides or accesses said second service, or alternatively, the control code may be a separate "plug-in" or companion application configured to work in conjunction with the application providing or accessing said second service.

In embodiments, the user equipment may be a user terminal, i.e. a static or mobile computer terminal with a user interface comprising both user output means (e.g. screen) and user input means (e.g. keyboard, mouse and/or touch-screen). For example the user terminal may be a mobile user terminal such as a laptop, tablet, smartphone or smartwatch. In such cases the detection of the interaction is performed by receiving a signal from a component of the lighting system via the control interface (e.g. from a smart light switch or lighting bridge). If the user terminal is wireless (e.g. mobile), then the control interface comprises one or more wireless I/O modules which are used to perform the control of the lighting system and the receiving back of the signal from the lighting system according to any one or more wireless communication protocols.

Alternatively the user equipment may be one or more components of the lighting system itself, such as a smart light switch or lighting bridge. In this case the detection of the interaction may be internal, e.g. by control code run within the smart switch detecting the user pressing the switch; and the control code may perform the action in repose to said interaction via a user terminal in the environment or even by communicating directly with a remotely-hosted application on a server providing the second service. For instance, a smart light switch or lighting bridge may be installed with an embedded instance of a social media client or web client (perhaps a special stripped-down version of the client for embedding in lighting system components).

The user equipment may also take the form of a combination of the user terminal and the one or more components of the lighting system, with the control code being distributed between them.

Furthermore, note that the control code, or the method, need not necessarily be implemented on (or not necessarily wholly on) user equipment of any form. Instead, the control code may partially or wholly be implemented on a server, or the method may be implemented partially or wholly on server (where a server herein refers to a logical entity which may comprise one or more physical server units at one or more geographical sites). In today's world of increasing distributed or "cloud based" processing, the physical location at which controlling software or a controlling method is implemented need not be a limiting factor, and in general the control could be implemented on by a user equipment; or a server; or any combination of user equipment, server, and/or other components.

Hence according to another aspect disclosed herein, there is provided apparatus comprising: an output interface for interfacing with a lighting system comprising one or more luminaires which provide a first service of emitting illumination into an environment occupied by a user; a input interface for receiving a first user input signal indicating that the user has performed a first interaction with a user input element of the lighting system; and a controller configured to control, via the output interface, the illumination emitted by at least one of the luminaires based on the first user input signal; wherein the controller is configured to detect a notification generated by an application, wherein the application provides the user with a second service other than controlling a lighting system, and the notification is indicative of an event occurring within the second service; wherein the controller is further configured so as, in response to the detection of said notification, to automatically control the lighting system via the output interface in order to alert the user to said event; wherein the input interface is further operable to receive a second user input signal indicating that the user has performed a second interaction with the user input element of the lighting system following said alerting of the user to said event; and wherein the controller is configured so as, in response to the receipt of the second user input signal, to automatically perform an action in relation to the second service.

As mentioned, the apparatus may take the form of a user equipment (comprising one or more user devices); or a server (comprising one or more server units); or any combination of user equipment, server, and/or other components. Note also that controller may be implemented in software or in hardware or any combination of software and hardware.

In embodiments, the controller may be further configured to conduct operations in accordance with any of the method features disclosed herein.

According to another aspect disclosed herein, there is provided a system comprising: a lighting system comprising one or more luminaires which provide a first service of emitting illumination into an environment occupied by a user; a user input element of the lighting system configured to allow a user to perform a first user interaction; user equipment configured to run an application for providing or accessing a second service other than controlling a lighting system; and a controller configured to control the illumination emitted by at least one of the luminaires based on the first user interaction; wherein the controller is configured to:

(i) detect a notification generated by said application, the notification being indicative of an event occurring within the second service; (ii) in response to the detection of said notification, automatically control the lighting system in order to alert the user to said event; (iii) detect when the user has performed a second interaction with the user input element of the lighting system following said alerting of the user to said event; and (iv) in response to the receipt of the second user input signal, to automatically perform an action in relation to the second service.

Again the controller may be implemented in software hardware or any combination thereof; and may be implemented on the user equipment, on another user equipment, on a server, or on any combination of these and/or other devices. In embodiments the controller may be further configured to conduct operations in accordance with any of the method features disclosed herein.

BRIEF DESCRIPTION OF THE DRAWINGS

To assist understanding of the present disclosure and to show how embodiments may be put into effect, reference is made by way of example to the accompanying drawings in which.

DETAILED DESCRIPTION OF EMBODIMENTS

Many people are running parallel lives between their online commitments (e.g. social media, stocks, e-mail, IM and a general desire to stay connected) and their commitments in their real lives (such as managing a family, work and their social life). As mentioned, the need to keep an eye on smart devices is increasing for many, but constantly watching a screen can be a handicap when it comes to staying involved with other things in life. These worlds however are often very separate, tangible versus intangible. People spend time jumping between them, e.g. from checking an app one moment to stirring the dinner the next. As more and more products and services apply cloud based processing and online or remote control via apps, the pressure to juggle these two aspects of life will only get harder in the future.

To monitor and control their online world, people need to have a user terminal such as a smart phone, tablet, laptop or the like; i.e. a computer terminal with suitable user I/O components (e.g. a touchscreen) for viewing and interacting with the user interface of the online service in question (e.g. social media site, email client, etc.). When using such user terminals it is almost impossible to focus on other things in the real world. Smart lighting systems can help to bridge the gap between the real and virtual worlds. These smart (or "connected") lighting systems are typically controlled through smart devices such as the types of user terminal mentioned above. Furthermore, the properties of lighting make it a suitable technology to use as an ambient display: lighting systems are prevalently found in many possible environments that a user may find him or herself in, and the illumination from the luminaires of a lighting system usually fills most or all of the environment in which they are located; and hence illumination can thereby provide a readily accessible, easily-noticeable way for communicating information to users (as long as the users have been taught to understand that the light is being used as a medium for communication). There often also exist simple and convenient control points for lights, such as a Hue Tap switch or a dimmer remote. As identified herein, the fact that such control points are readily at hand can be exploited to provide an accessible, convenient way for a user to interact with an app or online service.

Hence according to embodiments disclosed herein, there is provided a means of linking the ongoing status of an app to a light source which can first provide ambient information, and then temporal control of the app is made possible via the light control system. E.g. a user may be waiting for a message from a particular person, and then when the message comes in, a light source near to the user changes a property of its emitted light to indicate this to the user, and the user can respond with a quick predetermined message via a flick of the light switch. Thus the status (e.g. number of messages, replies, likes, updates or other activity) of an online or mobile application is communicated through a light source and if the user alters the parameters of the light source using light control means such as lighting control app or physical lighting control interface (e.g. connected light switch) then this remotely influences the status of the app accordingly.

The status of the application, be it a local application or a web-hosted application, can be communicated via lighting parameters such as hue, intensity, saturation, colour temperature and/or dynamic properties such as flashing, light transitions over time, etc. Alternatively or additionally, in some luminaire embodiments other output modalities that the app could control may include haptics, vibrations, temperature, aroma, motion, shape, etc.

The user can then influence the status of the app or perform an online transaction via the lighting system, for example via changing the hue, intensity, saturation, colour temperature and/or by controlling dynamic properties as input such as light transitions, flashes, etc. Other input modalities the user could provide can include changing the luminaire's location or shape, accelerating or de-accelerating the luminaire (e.g. controlled or random shakes), tapping the luminaire (or remote control device), etc.

Figure 1:
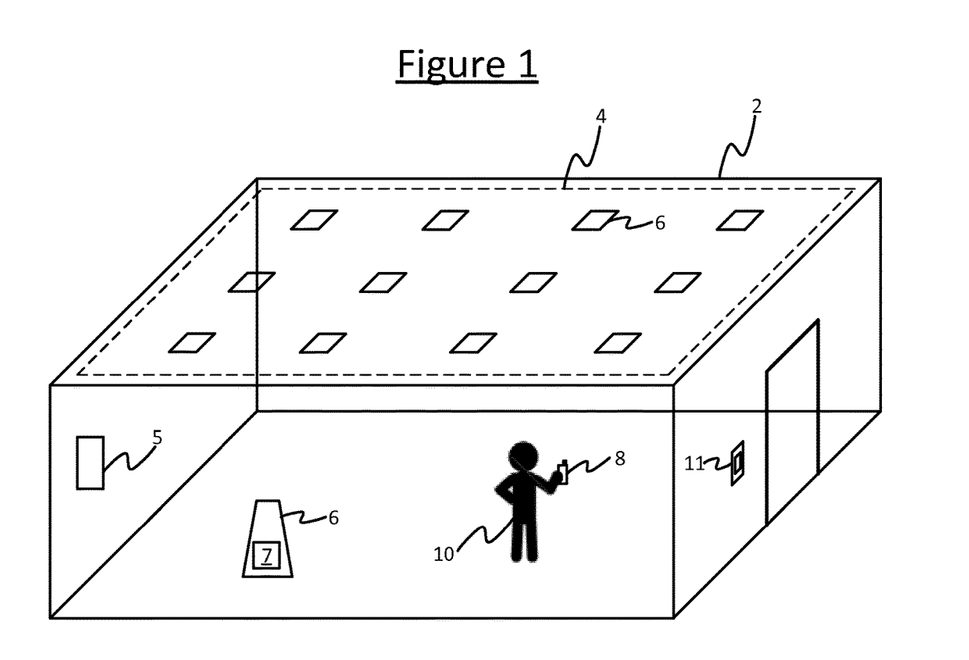
FIG. 1 is a schematic illustration of an environment illuminated by a lighting system.

FIG. 1 shows an illustrative lighting system 6 arranged to illuminate an environment 2 occupied by a user 10 according to embodiments of the present disclosure.

The lighting system 4 comprises one or more luminaires 6 installed or otherwise disposed in the environment 2, arranged to illuminate the environment 2 (so that the user 10 can see within the environment 2). The environment 2 may comprise an indoor space such as one or more rooms of a building, or an outdoor space such as a garden or park, or a partially covered space such as a gazebo, or another type of space such as the interior of a ship or train carriage. Each of the luminaires 6 comprises one or more lighting elements (lamps) plus any associated housing, socket or support; with each lighting element being of any suitable type such as an LED-based lamp, filament bulb or gas discharge lamp. Each of the luminaires 6 may take the form of a fixed luminaire installed at a fixed position within the environment, or may be a free-standing or even a portable luminaire (and the different luminaires 6 need not necessarily all be of the same type).

The user 10 has access to a user equipment in the form of a user terminal 8 which he or she can use at least when present in the environment 2. The user terminal 8 may take the form of a static terminal such as a desktop computer or wall-panel; or may take the form of a mobile user terminal such as a tablet, smartphone or smartwatch. As will be discussed in more detail shortly, the user terminal 8 is installed with at least one application which provides a service other than a lighting-related service to the user 10, or accesses such a service being provided from another, remotely-hosted application such as a web application. The user terminal 8 is also able to control one or more of the luminaires 6, preferably at least in order to control the illumination emitted by those luminaires 6.

The lighting system 4 may optionally comprise one or more other components 5, 11. These may comprise an additional user equipment 11 such as a "smart" light switch, e.g. mounted on a wall of the environment, the smart light switch 11 being so called as it is able to control the luminaires 6 (preferably at least in order to control the illumination emitted by those luminaires 6) via a data communications protocol rather than a simple, traditional wired electrical connection. Alternatively or additionally, the additional components of the lighting system 4 may comprise an intermediate component 5 such as a lighting bridge or centralized controller for mediating the control communications between the luminaires 6 and the user terminal 8 and/or smart switch 11.

Figure 3:
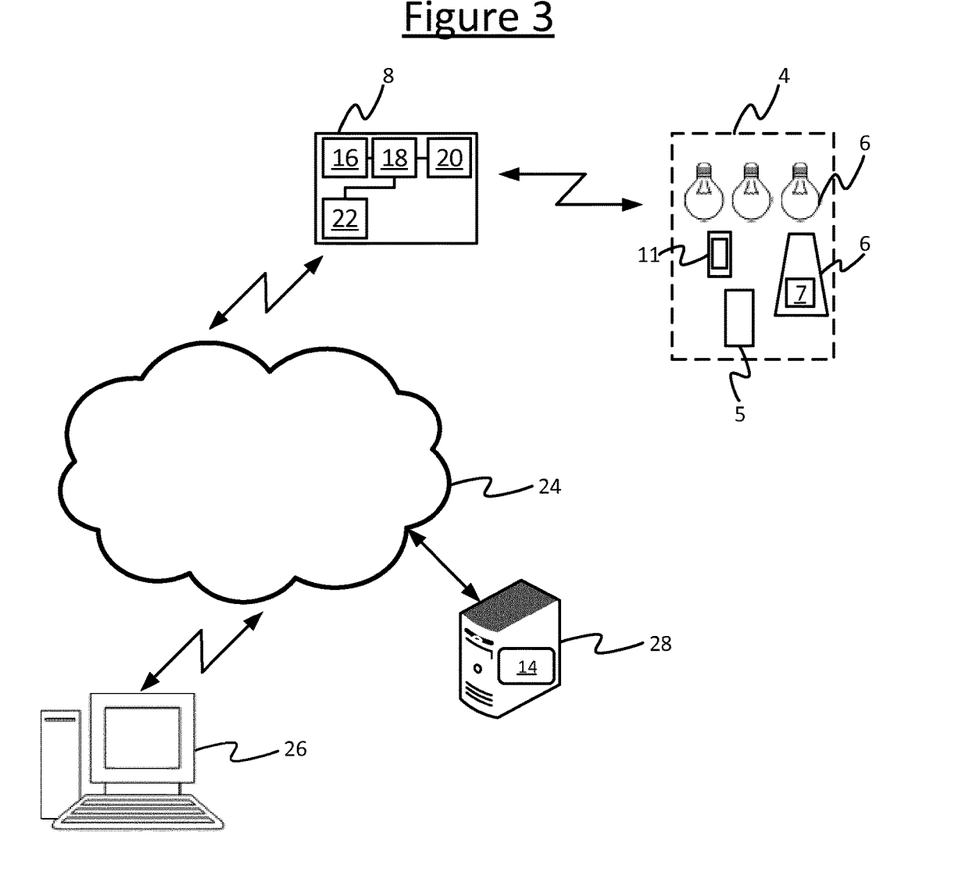
FIG. 3 is a schematic block diagram of a system comprising a communication system and lighting system.
Figure 4:
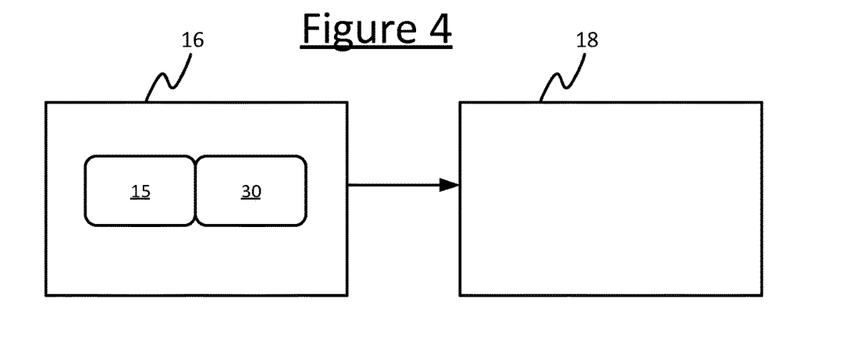
FIG. 4 is a schematic block diagram of a memory and processing apparatus arranged to run an application and a controller for interacting with a lighting system.

Further details of example embodiments are shown in FIGS. 3 and 4. As shown, the user terminal 8 comprises a memory 16, processing apparatus 18, lighting control interface 20 and a communications interface 22; each of the memory 16, lighting control interface 20 and communications interface 22 being operatively coupled to the processing apparatus 18.

The memory 16 comprises one or more memory units based on one or more storage media, e.g. magnetic storage such as a hard drive, or electronic storage such as an EEPROM (or "flash" memory). The processing apparatus 16 comprises one or more processors implemented in one or more dies formed in one or more packages. The lighting control interface 20 comprises one or more wired and/or wireless I/O (input/output) components for communicating with the lighting system 6, plus one or more corresponding data communications protocols stored on one or more of the memory units of the memory 16 and arranged to run on one or more processors of the processing apparatus 18 so as to implement the communications with the lighting system 6. The communications interface 22 comprises one or more I/O components for communicating with a remote user terminal 26 and/or a server 28 over a network 24, plus one or more corresponding data communications protocols stored on one or more of the memory units of the memory 16 and arranged to run on one or more processors of the processing apparatus 18 so as to implement the communications with the remote user terminal 26 and/or server 28 over the network 24. The network 24 may comprise a wired or wireless network, a public or private network, and a local area network or wide area network. E.g. the network 24 may comprise a public wireless local area network such as present in a café, bar or hotel; or a wired or wireless company intranet (local area or wide area); or a wide area wireless network such a mobile cellular network; or wide area internetwork such as that commonly referred to as the Internet; or any combination of these. Note also that the lighting control interface 20 may comprise the same (or one of the same) physical I/O components as the communications interface 22, or may comprise different physical I/O components.

As shown in FIG. 4, the memory 16 stores an application 15 and a lighting controller 30 in the form of lighting control code (each of which may be stored on one or more of the memory's one or more memory units). Each of the application 15 and controller 30 is arranged to be fetched from the memory 16 to be run on the processing apparatus (on one or more of the processing apparatus's one or more processors). The application 15 and controller 30 are configured so as when thus run to perform operations in accordance the following disclosed embodiments. Note also that the controller 30 may in fact be an inherent part of the application 15 itself, or may alternatively be or be part of a separate lighting control application arranged to operate in conjunction with the application 15. Note also that in other embodiments, the controller 30 may be implemented elsewhere, such as on the smart switch 11, or on the bridge 5, or on a server (not shown). These embodiments will be described in more detail later, but for now, by way of example, embodiments will be described in terms of a controller 30 implemented on the user terminal 8.

The application 15 is configured to provide the user 10 with a certain (non-lighting-related) service through the user terminal 8. For example the application 15 may comprise an email client for sending and receiving emails to and from, respectively, a user of the remote terminal 26 via the network 24. As another example the application 15 may comprise an IM client for sending and receiving IM message to and from, respectively, a user of the remote terminal 26 via the network 24. As another example, the application 15 may comprise a VoIP client for conducting VoIP (voice over Internet Protocol) calls with a user of the remote terminal 26 via the network 24 (which may be just voice calls or video calls comprising a combination of voice and video).

Alternatively the application 15 may be configured to enable the user 10 to access, through the user terminal 8 and via the network 24, a certain (non-lighting-related) service provided by an application 14 running on a server 28. For example, the local application 15 on the user terminal 8 may be a general purpose web-browser and the application 14 on the server 28 which it accesses may be a web-hosted application, such as a social media site (sometimes also called a social networking site), accessed over the Internet.

In further embodiments, the service may be provided by a combination of a local application 15 on the user terminal 8 and a remotely-hosted application 14 on the server 28. For example the local application may comprise a dedicated social media (social networking) app which accesses a social media (social networking) service provided from the server 28. Or the local application 15 may comprise a VoIP or IM client which conducts VoIP or IM communications with the remote user terminal 26 via a VoIP or IM service implemented on the server 28 (e.g. the application 15 on the server 28 providing for address look-up and/or acting as a relay of the IM message or VoIP call).

Note that a server 28 as referred to herein may comprise one or more physical server units located at one or more physical sites. Note also that an application as referred to herein, whether referring to the local application 15 or remotely-hosted application 14, does not necessarily refer to a single monolithic unit of software. Techniques for local or distributed processing will be familiar to a person skilled in the art.

The controller 30 is configured to detect a status of the local application 15 and/or remotely-hosted application 14; and in response to detecting an event in the form of a change in this status, to control one or more of the luminaires 6 in order to alert the user 10 to this change. Preferably this comprises controlling a property of the illumination emitted by the one or more luminaires 6 in question, e.g. by changing the intensity, colour, direction, distribution or a dynamic effect of the emitted illumination. However, it is not excluded that the controller 30 may alternatively or additionally control some other feature of the luminaire(s) 6 or lighting system 4. E.g. a luminaire 6 may be equipped with an aroma emitter, vibrator, haptic component, heater, shape-changing means, and/or motor for self-locomotion; and the controller 30 may be configured to control one or more of these to alert the user to the change in status.

In embodiments, the service provided by the application(s) 14, 15 may comprise an inter-user communications service such as an email service, IM service, VoIP service or social media (social networking) service; and the change in status which the controller 30 is configured to detect may comprise receipt of an incoming message from the user of the remote terminal 26, such as an incoming email, IM, social media update, or call establishment request (i.e. the remote user is "ringing" the local user 10). As another example, the change in status being detected may comprise the fact that a number of such messages has exceeded a threshold. In other embodiments, the service provided by the application(s) 14, 15 may comprise an online game and the change in status being detected may comprise a change in a status of the game. In another embodiment, the service provided by the application(s) 14, 15 may comprise an online purchasing service such as an online store or auction, and the status being detected may comprise a change in a status of the purchasing service, e.g. a new product is available or a new bid has been placed.

Note that the status being detected may comprise a status of the local application 15, or remotely hosted application 14, or a combination of both. For convenience, where the status of "the" application or app is referred to generally herein, it will be understood that this may refer to the status of either or both of a local application 15 or remotely-hosted application 14. Similarly it may be convenient to refer to the status of the service provided by either or both such applications 14, 15.

Once the controller 30 has alerted the user 10 to the change in status through the control of the lighting system 4, the user 10 then has the chance to react by interacting with the same lighting system 4, e.g. pressing a smart light switch 11, or moving a portable luminaire 6, 7. The controller 30 is configured to automatically detect this interaction and in response to automatically, from the user terminal 8, perform an action in relation to the non-lighting related service provided by the application(s) 14, 15.

For example if the detected change in status is an incoming communication such as an email or IM from the user of the remote terminal 26, the response triggered by the user 10 interacting with the lighting system 4 may be to send a pre-composed message such as another email or IM (respectively) back from the local user terminal 8 to the user of the remoter terminal 26 via the network 24 and communication service, e.g. saying something to the effect of "Can't discuss now, I'm busy". Or if the detected change in status is a social media update, the response triggered by the user 10 interacting with the lighting system 4 may be to make a predetermined post to the social media service via the network 24, e.g. to "like" the update. Or if the detected change in status is an incoming call request, the response triggered by the user 10 interacting with the lighting system 4 may be to decline the request (perhaps with a predetermined message another medium such as IM saying something to the effect of "Can't talk now, I'm busy" and/or "will call you back later"). Or if the user 10 has a hands free peripheral connected to the user terminal 8, the predetermined response could even be to answer the call. As another example, if the detected change in status is an event within an online game (perhaps a turn-based game), the response triggered by the user 10 interacting with the lighting system 4 may be to make a predetermined move or to send a message to the other player(s) saying the user 10 is busy and can't make a move at the moment. As yet another example, if the detected change in status event in online store or auction, the response triggered by the user 10 interacting with the lighting system 4 may be to make a predetermined offer.

The interaction to which the controller 30 is configured to respond may take any of a number of forms. For example in embodiments the lighting system 4 comprises a smart light switch 11, e.g. mounted on a wall of the environment 2, or placed on another surface such as a table. The switch 11 is configured to enable the user 10 to control the illumination emitted by one or more of the luminaires 6, such as to turn it on or off, dim it up or down, change its colour, adjust a dynamic effect (e.g. frequency of flashing or pulsing), or change a beam direction or profile of the respective illumination. In this case the controller 30 may be configured to detect when the user 10 has done this following the alert to the change in status of the application(s) 14, 15 (in embodiments to detect whether the user has done this within a predetermined window of time), and if so, to then trigger the appropriate response (see above). As another example, the controller 30 may also be configured to allow the user 10 to manually control the illumination emitted by one or more of the luminaires 6 (again such as to turn it on or off, dim it up or down, change its colour, adjust a dynamic effect, and/or change its direction or profile), such that the user terminal 8 also acts as a remote control device for the lighting system 4. In this case, the controller 30 may be configured to detect whether the user 10 has done this following the alert (again perhaps within a predetermined time window), and if so trigger the predetermined response. In a variant, the same thing could be implemented for a separate remote control device (not shown), e.g. a dedicated remote control device, which the user 8 can use to control the illumination from one or more of the luminaires 6. As yet another example, at least one of the luminaires 6 may be a moveable luminaire, e.g. a portable luminaire, and may be equipped with one or more motion sensors 7 such as one or more accelerometers, gyro sensors, magnetometers and/or tilt sensors. In this case, the controller 30 may be configured to detect whether the user 10 has moved the moveable luminaire following the alert (again perhaps within a predetermined time window), and if so trigger the predetermined response.

Note: in embodiments, the triggering of the response to the change in status may be conditional on the user 8 controlling one or more of the same luminaires 6 that were used to alert the user 8 to the change in status. E.g. so on condition that the user 10 uses the switch 11, user terminal 8 or other remote control device to control one or more of the same luminaires 6 which the controller 30 used to alert the user 10, or moved one of the same luminaires 6 which the controller 30 used to alert the user 10, then the controller 30 triggers the appropriate response (e.g. send a predetermined reply to the remote user, make a predetermined social media post, perform a predetermined game action, make an predetermined financial offer, etc.).

Furthermore, note that depending on implementation, the lighting system 4 may be configured such that when the change in application status occurs (e.g. when an incoming notification is received) then the user's interaction with the lighting system 4 may or may not have its normal function of actually controlling the luminaire(s) 6. E.g. the interaction may or may not have its normal function of actually controlling the emitted illumination. In embodiments, the lighting system 4 is configured to temporarily not listen to lighting control commands from the control devices 11, 8, 7 (e.g. for a predetermined period of time following the detection of the change in status). So for instance when a notification comes in and a user 10 presses a button, e.g. on the smart light switch 11 or in a lighting control app on the user 8, then in embodiments this button should not have the normal action assigned to it, but temporarily has another action (i.e. responding or reacting to the notification). E.g. when the user selects to dim up or down the illumination, or change its colour, in response to a change in status of the local and/or remote application 14/15, then whereas in other circumstances this would indeed dim the illumination up or down or change its colour, temporarily it now does not and instead causes the automated action to be performed by the controller 30 in response to the application status. However, in alternative embodiments, then even when the change in application status is detected (e.g. even when the incoming notification comes in), then the interaction does still have its normal function of controlling one or more of the luminaires 6 (e.g. to control their illumination such as to dim up or down or change its colour), in addition to the automated action taken in response to the change in application status (e.g. in addition to the automated reply).

Note also that the various communications disclosed herein may be implemented through any one or more of a variety of different possible wired and/or wireless means, and the different communications could be implemented through the same type of connection or a different type. Such connection means include direct wireless connection, connection via a wireless network (e.g. WLAN), direct wired connection, or connection via a wired network. Examples of suitable wireless media include radio frequency (RF), infrared, visible light communication (VLC, sometimes also called coded light), or ultrasound. Examples of suitable wireless communication standards include Wi-Fi, ZigBee or Bluetooth. Examples of suitable wired communication standards include Ethernet or DMX.

For instance in order to implement the various communications with the remote terminal 26 and/or server 28, the network 24 may comprise the Internet 24 and the communications interface 22 may be configured to connect the user terminal 8 to the Internet 24 via a wireless access point or router disposed in the environment 2, using a wireless connection such as a Wi-Fi connection between the user terminal 8 and the router or access point.

Regarding the lighting side of the system, in order for the controller 30 to control of the luminaires 6 from the user terminal 8, and for the controller 30 to receive back indication from the lighting system 4 that the user has interacted with the lighting system 4, the lighting control interface 20 may for example comprise a wireless interface for connecting to the lighting system 4 via a wireless connection such as a Wi-Fi, ZigBee or Bluetooth connection (note again that where the lighting control interface 20 and communications interface 22 use the same wireless communication medium, then some or all of the hardware may be shared by both interfaces 20, 22). The wireless connection by which the controller 30 controls the lighting system 4 may be implemented by means of a direct wireless connection with each of the one or more luminaires 6, or alternatively via an intermediate node 5 such as a lighting bridge or central controller. For example, the lighting control interface 20 may comprise a Wi-Fi interface arranged to form a connection with the lighting bridge 5 via Wi-Fi, while the bridge 5 connects to the luminaires 6 via ZigBee, and the controller 30 may thus control the luminaires 6 from the user terminal 8 via the lighting bridge 5. And to receive back an indication of the user's interaction with the lighting system 4, this could similarly be received back from the luminaires 6 directly or via an intermediate component such as the bridge 5 or a central controller. Or in the case where the user's interaction is via the user terminal 8 itself, the detection of this interaction may be internal.

If the smart switch 11 is used, this may for example be connected to control the luminaires 6 via a direct wireless connection, e.g. direct Wi-Fi or ZigBee connection with each; or via an intermediate wireless node 5 such as the lighting bridge or a central controller. If the user interacts with the smart switch 11, this may be reported to the controller 30 on the user terminal 8 via a direct wireless connection such as a Wi-Fi connecting or again via an intermediate wireless node 5 such as a bridge or central controller. E.g. the bridge 5 may bridge between a Wi-Fi connection with the user terminal 8 and a ZigBee connection with the wireless switch 11. Similar comments can apply in relation to the possibility of a portable luminaire equipped with motion sensor(s) 7.

Figure 2:
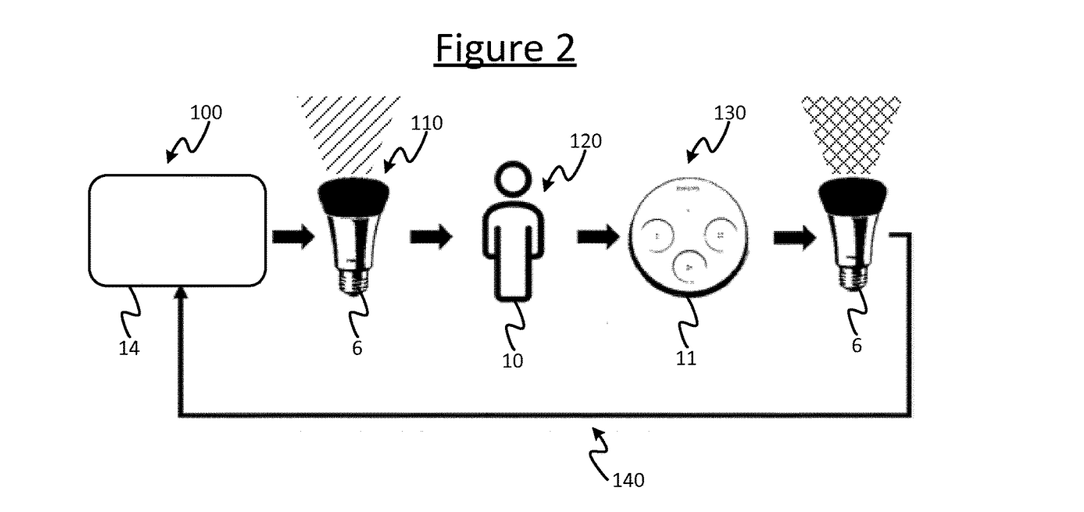
FIG. 2 is a schematic process flow diagram showing a process of a user being alerted to, and then responding to, a status update.

To recap, FIG. 2 gives an overview of the process disclosed above. At step 100 an event is triggered by the local app 15 or web app 14. At step 110, a light setting of at least one of the luminaires 6 is changed by the controller 30 (e.g. being part of the local app 15 or a partner app to it). At step 120 the user 10 sees this change. At step 130, the user adjusts the light setting, e.g. via smart switch 11 or via a control on the user terminal 8. At step 140, depending on how the light setting was changed by the user 10, an update is made in the app 14/15 or its status is directly related to the event that caused the initial change in the light setting.

Some particular example implementations and use cases are now discussed in more detail.

For instance, in embodiments a mobile application 15 is set so that it can send a status update to the lighting system 4. A code is pre-defined to specify what change in illumination indicates what change in app status. This code will be understood by the user, having had this explained for example though online instructions, a printed manual or word of mouth. For instance the code could be that brighter or red illumination means signals that a change has occurred, or perhaps that brighter or redder illumination indicates a higher value of some parameter of the app (e.g. number of received messages) as a matter of degree. At least one luminaire 6 is assigned through which to signal this code, e.g. having been selected by the user 10, or by the controller 30 according to some default protocol, or simply being preconfigured (e.g. by the manufacturer or a commissioning technician). An input code is also pre-defined to specify what interaction by the user 10 will constitute a response to the alert. Again this could be selected by the user, or by the controller 30 according to some predefined protocol, or could simply be preconfigured. The input code could for example be that pressing the smart switch 11, or adjusting the illumination from the signalling luminaire 6 (perhaps to undo the change that user used to alert him or her), or moving a portable luminaire so as to generate beyond a threshold motion sensor reading, means that the wiser wishes to react to the event; or perhaps that a degree of adjustment of the illumination or a degree or movement of a moveable luminaire indicates a degree of the user's response.

The status and code are communicated between the lighting system 4 and the controller 30. This may be done via a proxy (e.g. the lighting bridge 5). The status is processed and applied to a light value output. In embodiments the light output value is sent to the bridge 5 which controls the assigned light source 6. The user 10 then sees the light output and reacts to this light output using a control device 11/8/7 for the lighting, e.g. tap switch, dimmer switch, on-luminaire control, sensor(s), wearable device, etc. In embodiments this light input signal is sent to the bridge 5, and the bridge 5 passes on the input to the processing device 18 which processes the input code into a control update for the app 14/15. Thus the control update is sent to the app 14/15 and the app is updated. A new output status may then be resent in order to loop the process.

In one example use case, when a new e-mail comes in, this causes the light form one or more of the luminaries 6 to blink, and the user 10 dims this down in order to "snooze" the message. In response, a notification about the new email is removed from the user's phone 8.

As another example use case, consider an online auction. If another bid was made on top of the user's own bid, the illumination changes colour to red. The user 10 changes this back to green by recalling a pre-set in the smart switch 11. This causes a new bid for the user to be placed.

In another example, a new personal message arrives through a social networking service. To signal this the illumination blinks. The user changes the illumination to blue by recalling a pre-set using the smart switch 11, and this causes an automatic reply, e.g. "will reply in a minute", to be sent to the sender of the message.

The techniques disclosed herein can in fact be applied to numerous types of mobile applications that require a degree of monitoring and action at a certain time. For example, in games that have a time based aspect to them, e.g. whereby players must wait for boats to arrive or crops to grow, then when the time comes the user can send a command via the light control. Or when waiting for auction sales or bids, then the user may place his or her next bid via the dimmer switch, e.g. selecting brighter light causes a higher bid is placed. Or when an incoming email meeting invitation is received, then the hue of the light used to alert the user 10 may represent the sender.

Another example use is in monitoring stress levels for the day, or counting steps or measuring some other activity of the user activity via an app. In this case the measured state of the user (e.g. stress level) may be display via a luminaire 6, and the luminaire 6 may be used by the user 10 to respond to the app about how he or she feels, such as via a colour code or a particular action. E.g. in the case of a movable luminaire, an accelerometer value from an onboard accelerometer 7 may be used to determines stress level.

Another example use case is to monitor whether another, or a particular, player goes online in an online game that the user 10 is playing. E.g. the illumination from a luminaire 6 starts flickering if that player invades the user's area in the game. The luminaire 6 can then be used to automatically attack that player, e.g. speed of dynamics of the illumination can be used to indicate the rigorousness with which to remove the other player from the user's area.

Another example use case is to monitor whether a new deal of a product the user 10 was waiting for arrives at the user's favourite website: if so the illumination starts to flicker, and the user 10 can react to immediately buy product under the new deal (e.g. by colouring the illumination green the user gives a command to buy it) or to reject the deal (e.g. by stopping the flickering).

The above has described applications in terms of apps with rich interfaces such as those for messaging, social media, auctions, etc. However other pieces of software or even appliances can also benefit from the present invention, particularly those with simpler interfaces. For example in a "smart home", the lighting can provide the status of appliances and temporal control can be enabled via the light control. In this case, the service being monitored for an event is a service provided by a home appliance, e.g. heating, cooking, or playing music or other media. The application 15 on the user terminal 8 may be an application configured to monitor and/or control the home appliance, or may be a general purpose application such as a web-browser for accessing a remotely-hosted (e.g. web-hosted) application 14 for monitoring and/or controlling the appliance (e.g. the remote application could be hosted on a server such as a web server or may even be embedded in the appliance itself). Either way, the change in status which triggers the controller 30 is a change in status in the monitoring application reflecting an event occurring in relation to the service provided by the home appliance). When the user reacts, then the controller 30 then controls the home appliance or even a different home appliance to perform some predefined operation.

For example, the user's heating turns on/or off, the lighting system 4 notifies the user 10 of this, and in response the user 10 can stop this action by interacting with the lighting system (e.g. pressing the smart light switch 11 or moving a movable luminaire 6, 7). Or as another example, the user's oven finishes baking, which is signalled via the lighting system 4, and in response the user can turn it off by interacting with the lighting system 4 (e.g. a button press on the light switch 11 or a lighting control app on the user terminal 8). Or as another example, the user's music-player device has reached the end of the playlist, which is signalled through the lighting system 4, and in response the user interacts with the lighting system 6 in order to it continue to the next playlist.

As yet another example, the lighting may be linked to a baby monitor, so that when the baby cries the illumination provides an additional signal that the baby is unhappy. Then for example, with a flick of the light switch 11, a parent can trigger music to play from the monitor to help calm the baby until the parent can arrive.

In further embodiments, which may apply to any of the use cases discussed above or others, note that the user may be provided with multiple different options for reacting when a change in status occurs, e.g. when a notification comes in. For example the smart light switch 11 may have multiple different buttons (e.g. this may be a Hue Tap switch which has four buttons). Some or all of the different buttons may then be assigned to different predefined responses or actions (e.g. which may be assigned by the user 10 him- or herself, or which may be pre-programmed by the manufacturer or by a commissioning technician). Depending on the event that occurs (e.g. the type of notification that is received), the user 10 can then select from amongst the different predefined responses by pressing the corresponding one of the different buttons. Or as another example, the lighting system 4 may comprise two or more different user input devices, e.g. both a smart light switch 11 and a moveable luminaire, such that user 10 may have the option of interacting with different ones of the input devices, e.g. by either pressing the switch 11 or moving the moveable luminaire. Different responses or reactions may be assigned to the different input devices (e.g. again which may be assigned by the user 10 him her- or herself, or which may be pre-programmed by the manufacturer or by a commissioning technician). For example, if the event is an incoming message from another, remote user (e.g. voicemail, IM, or email), the different options for interaction may select different pre-composed reply messages to be sent to the remote user. Or if the event is an incoming VoIP call establishment request from a remote user, the different options may select between, say, either answering with a hands-free peripheral or responding with a pre-composed messaged via another medium such as IM or voice message (e.g. to the effect of "can't talk not, I'm busy").

In such embodiments the controller 30 is configured to detect which option the user 10 has selected (e.g. which button on the smart switch 11 or lighting control app he or she has pressed, or which input device the user has opted to interact with), and based on this detection, to perform the corresponding action mapped to that option (e.g. send the corresponding response). For instance the different available reactions may comprise different pre-composed messages, or different types of reaction (e.g. to accept or reject an incoming call, or to select from different music tracks or genres in the case where the automated action is to play music). Thus the user does not have to always provide only one response, but rather may be given different responses to choose from.

In yet further embodiments, not that, as mentioned, the controller 30 need not necessarily be implemented on the user terminal 8.

In another example implementation, the controller 30 may be implemented on another piece or user equipment, e.g. a component of the lighting system 4 such as the smart switch 11. In this case, in order for the controller 30 to the detect the change in application status of the relevant application 14/15, the controller 30 may be configured to communicate with the application 15 on the user equipment 8, and/or with the application 14 hosted on the server 28, via any one or more of a variety of wired and/or wired communication means. For instance, where the change in status comprises a change in the status of the local application 15, the controller 30 may detect the change in status via a wireless connection between the user terminal 8 and the smart switch 11 or bridge 5, which may be either a direct local wireless connection such as ZigBee, Wi-Fi or Bluetooth connection, or which may be implemented over a wireless local area network such as a Wi-Fi, ZigBee or Bluetooth network. Or if the user terminal 8 is a static terminal such as a wall panel or a desktop computer, then the controller 30 may detect the change in status via a wired connection between the user terminal 8 and switch 11 or bridge 5, e.g. an Ethernet, DMX or power-line communication (PLC) connection. A combination of any such communication means may also be used. If the change in status alternatively or additionally comprises a change in status of a remotely-hosted application 15 hosted on a server 28, then the controller 30 may again detect this change in status via any wired and/or wireless connection between the server 28 and smart switch 11 or bridge 5. E.g. the smart switch 11 or bridge 5 may connect to the server 28 for this purpose via a wireless connection to a wireless access point, e.g. using Wi-Fi, ZigBee or Bluetooth, and then from the access point to a wired network such as a local wired network (e.g. Ethernet or DMX) or the Internet.

In another example implementation, the controller 30 may be implemented on a server, which may or may not be the same as the server 28 hosting the application 14, and which may be local or remote to said environment 2. E.g. if the controller 30 is hosted on a remote server, then in order to detect the change in status of the application 15 on the user terminal 8, then this server may connect between the controller 30 to the application 14 via the Internet and a local wireless access point in the environment 2, e.g. a Wi-Fi, ZigBee or Bluetooth access point, or a local wired network such as an Ethernet, DMX or PLC network. As another option, in order to detect the change in status in the application 15, the server hosting the controller 30 may connect to the user terminal 8 via a mobile cellular network such as a 3GPP network. If the change in status alternatively or additionally comprises a change in status of a remotely-hosted application 15 hosted on a server 28, then the controller 30 may detect this change in status via the Internet, or even internally is hosted on the same server unit.

Anything functionality ascribed above to a controller 30 implemented in the form of software run on the user terminal 8, such as described in relation to FIGS. 3 and 4, may equally be applied to an implementation of the controller 30 on another device or devices, such as on a the smart switch 11 or on a server. Further, the controller 30 may be implemented in a distributed fashion, e.g. partially on the user terminal 8 and partially on a server. In further embodiments, the controller 30 could be implemented as a distributed control function embedded in the luminaires 6 themselves; or any combination of the bridge 5, luminaires 6, user terminal 8 and/or a server.

Note also that while the controller 30 is preferably implemented in software, then, at whatever device or devices it is implemented, it is not excluded that the controller 30 could instead be wholly or partially implemented in dedicated hardware circuitry, or configurable or reconfigurable circuitry such as a PGA or FPGA.

Figure 5:
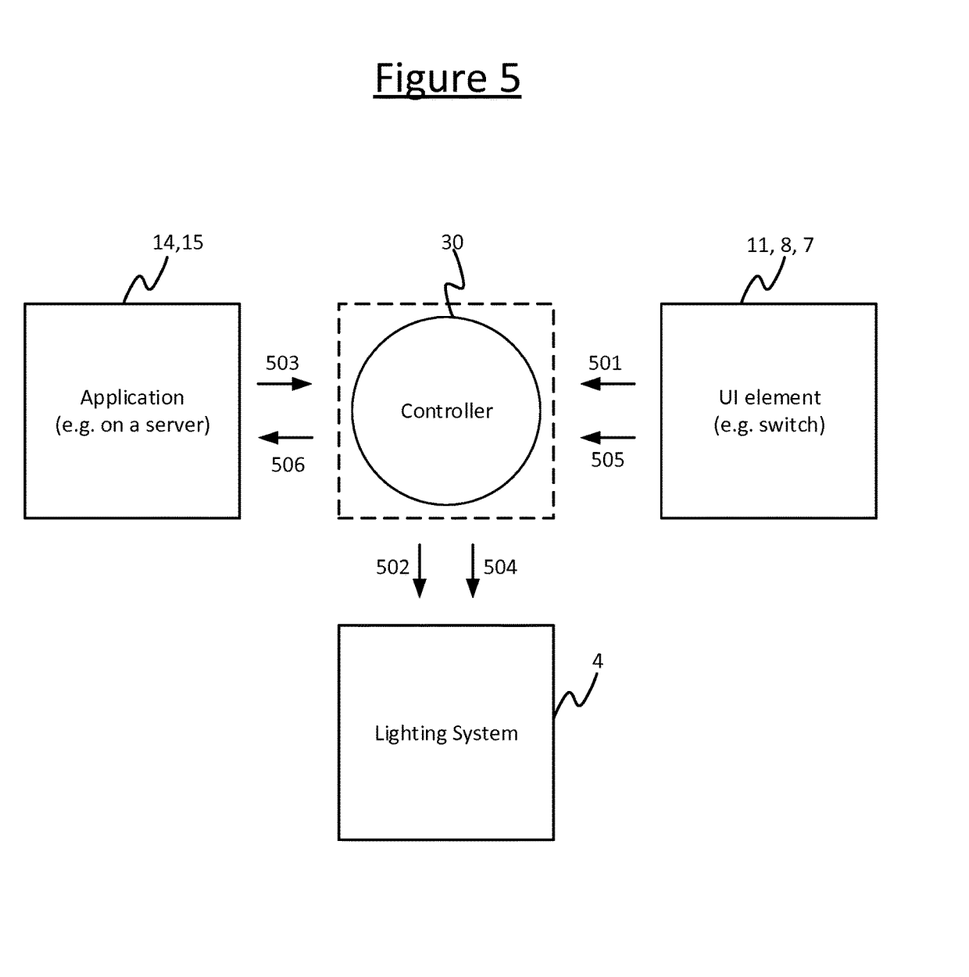
FIG. 5 is a schematic block diagram of a system for interfacing between a lighting system and an application.

FIG. 5 gives a schematic block diagram of the system abstracted from any particular example implementation of the controller 30. At step 501, the controller 30 receives a lighting control command from a user interface device (e.g. a switch 11, user terminal 8 or movable luminaire 6, 7) based on a first user input. At step 502, the controller 30 controls the illumination of the lighting system 4. At step 503, the controller 503 receives an indication of an event from an application 14/15, which could be running on the same device as that from which the user input is received (e.g. when both are from a user terminal 8), or which could be running on a further device, such as a server 28. At stop 504, the controller 30 controls the lighting system 4 to alert the user 10. At step 505, the controller 30 receives a second user input from the user interface device (e.g. switch 11, user terminal 8 or movable luminaire 6, 7). At step 506 the controller 30 transmits a response to the event to the application 14/15 (e.g. server 28 or user terminal 8) based on the received second user input. Steps 501-502 relate to the 'first service' of providing lighting, and steps 503-506 relate to the 'second service' other than providing or controlling lighting (e.g. the communication service, social media service or household appliance related service).

It will be appreciated that the above embodiments have been described by way of example only. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A method of interfacing with a lighting system comprising one or more luminaires which provide a first service of emitting illumination into an environment occupied by a user, the method comprising:

receiving a first user input signal indicating that the user has performed a first interaction with a user input element of the lighting system;

controlling the illumination emitted by at least one of the luminaires based on the first user input signal;

detecting a notification generated by an application, wherein the application provides the user with a second service other than controlling a lighting system, and the notification is indicative of an event occurring within the second service; in response to the detection of said notification, automatically controlling the lighting system in order to alert the user to said event;

receiving a second user input signal indicating that the user has performed a second interaction with the user input element of the lighting system following said alerting of the user to said event; and in response to the receipt of the second user input signal, automatically performing an action in relation to the second service by sending a response in relation to the second service, wherein the automatically performing of said action is conditional on said second interaction or the receipt of said second user input signal occurring within a predetermined window of time following the event or the detection of the notification of the event, and wherein the second user interaction is the same as the first interaction, but the method comprises refraining from controlling the illumination from any of the luminaires based on the second user input signal, on condition that the second user interaction or the receipt of the second user input second signal occurs within said window of time.

2. The method of claim 1, comprising detecting, from the second user input signal, which of multiple second user inputs the user has used;

wherein the action performed automatically in response to the second user input signal is a function of which of the multiple second user inputs the user has used.

3. The method of claim 1, wherein said user input element is a light switch.

4. The method of claim 1, wherein said user input element is a user interface of lighting control software run on a user terminal.

5. The method of claim 1, wherein said user input element is a moveable luminaire comprising a motion sensor for detecting user interactions, the moveable luminaire being one of said one or more luminaires of the lighting system, and wherein each of the first and second user interactions comprises the user moving the moveable luminaire.

6. The method of claim 1, the second service is a communication service for communicating between a user terminal of the user and a remote entity over a network, said event comprising an incoming communication from the remote entity addressed to the user via the communication service; and the action performed automatically in response to the receipt of the second user input signal comprises: responding to the incoming communication by sending a predetermined response to the remote entity via the communication service.

7. The method of claim 6, wherein the remote entity is a remote terminal, the communication service comprises an inter-user communication service, the incoming communication comprises an incoming communication sent from a person using the remote terminal, and the predetermined response comprises: a predetermined message to the person who sent the incoming communication.

8. The method of claim 7, wherein the event comprises an incoming communication from a particular person or particular group of people, said automatic control of the lighting system being performed on condition that the incoming communication is from said particular person or group of people.

9. The method of claim 1, wherein the second service comprises a function provided by a home appliance, said application being an application which is able to monitor and/or control the home appliance, and said event comprising an event relating to the function provided by the home appliance; and wherein the action which is automatically performed in response to the receipt of the second user input signal comprises: controlling the function of the home appliance or controlling a function of another home appliance.

10. The method of claim 6, wherein the remote entity is a server, the communication service comprises a social media service hosted by the server, and the incoming communication comprises a notification of an update occurring within the social media service.

11. The method of claim 1, wherein said automatic control of the lighting system to alert the user to said event comprises: controlling the illumination emitted by at least one or the luminaries.

12. A computer program product comprising code embodied on computer-readable storage and configured so as when run on one or more processing units to perform the method of claim 1.

13. Apparatus comprising:

an output interface for interfacing with a lighting system comprising one or more luminaires which provide a first service of emitting illumination into an environment occupied by a user;

a input interface for receiving a first user input signal indicating that the user has performed a first interaction with a user input element of the lighting system; and a controller configured to control, via the output interface, the illumination emitted by at least one of the luminaires based on the first user input signal;

wherein the controller is configured to detect a notification generated by an application, wherein the application provides the user with a second service other than controlling a lighting system, and the notification is indicative of an event occurring within the second service;

wherein the controller is further configured so as, in response to the detection of said notification, to automatically control the lighting system via the output interface in order to alert the user to said event;

wherein the input interface is further operable to receive a second user input signal indicating that the user has performed a second interaction with the user input element of the lighting system following said alerting of the user to said event; and wherein the controller is configured so as, in response to the receipt of the second user input signal, to automatically perform an action in relation to the second service by sending a response in relation to the second service, wherein the automatically performing of said action is conditional on said second interaction or the receipt of said second user input signal occurring within a predetermined window of time following the event or the detection of the notification of the event, and wherein the second user interaction is the same as the first interaction, and wherein the controller is configured to refrain from controlling the illumination from any of the luminaires based on the second user input signal, on condition that the second user interaction or the receipt of the second user input second signal occurs within said window of time.

\* \* \* \* \*